June 10, 1969    P. V. PALMQUIST ET AL    3,449,201
TIRE SIDEWALL FACINGS
Filed Oct. 10, 1966
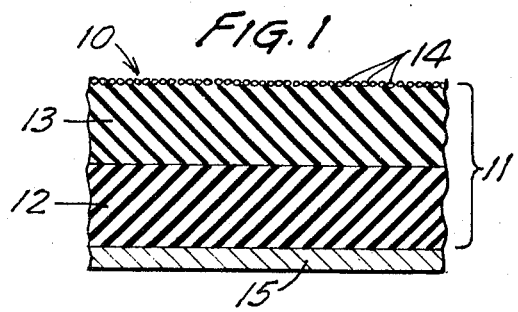
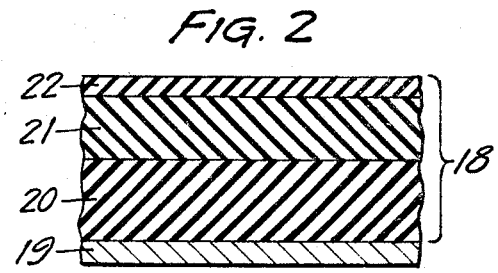
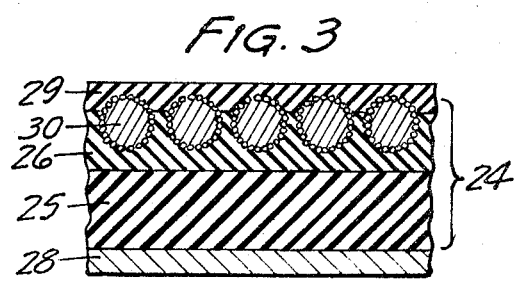
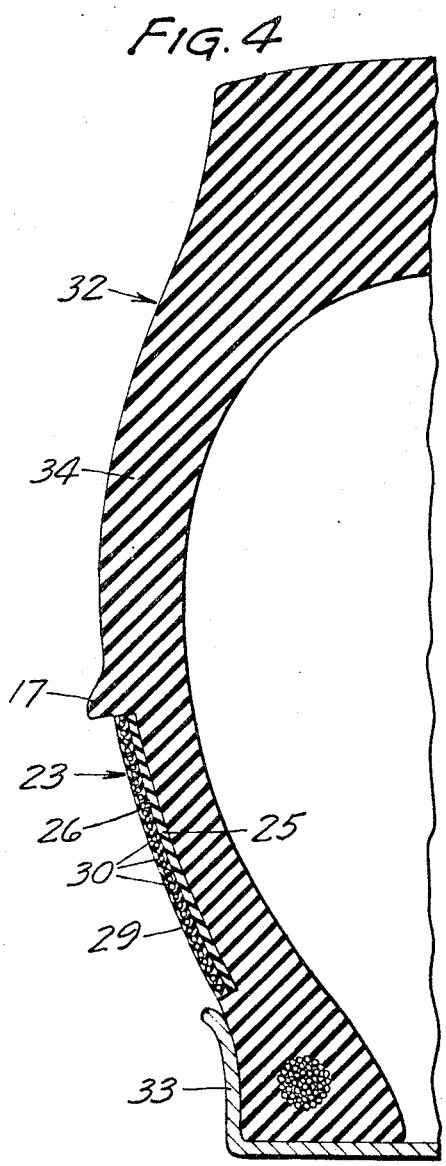
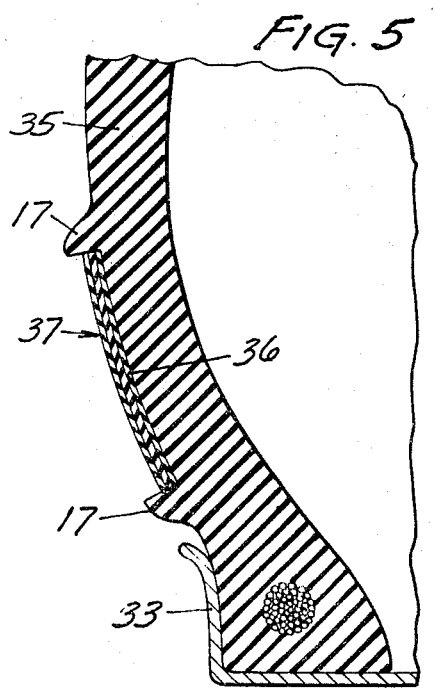
INVENTORS
PHILIP V. PALMQUIST
NELSON JONNES
BY Carpenter, Kinney & Coulter
ATTORNEYS United States Patent Office 3,449,201
Patented June 10, 1969

3,449,201
TIRE SIDEWALL FACINGS
Philip V. Palmquist, Maplewood Village, and Nelson Jonnes, Stillwater, Minn., assignors to Minnesota Mining and Manufacturing Company, St. Paul, Minn., a corporation of Delaware
Continuation-in-part of application Ser. No. 506,530, Nov. 5, 1965. This application Oct. 10, 1966, Ser. No. 585,450
Int. Cl. D06n 7/04; B32b 17/10, 27/38
U.S. Cl. 161—164        12 Claims

ABSTRACT OF THE DISCLOSURE

Sheet material comprising an elastomeric support sheet capable of elastic elongation of at least 200 percent and reflex-reflective elements partially embedded in the support sheet, at least the back outer stratum of the sheet including a vulcanizable elastomer. In a preferred embodiment the elements are embedded in a material comprising an organic compound having oxirane functionality and a poly (tetramethyleneoxide) diamine that is a curing agent for the oxirane compound.

REFERENCE TO FIRST APPLICATION

This application is a continuation-in-part of our application Ser. No. 506,530, filed Nov. 5, 1965, now U.S. Patent No. 3,382,908.

At the present time, white sidewalls comprise the most common decoration of automobile tires. In the conventional method for incorporating white sidewalls in a tire, a layer of elastomeric material colored white, such as zinc or titanium oxide-pigmented neoprene tire rubber is included as an intermediate layer in the several layers of uncured rubber which are to form the tire body. When these layers of rubber are formed into a tire shape and vulcanized, the white layer becomes a substratum in the tire sidewall. Subsequently, the rubber that covers the white layer is abraded away to reveal a white sidewall surface.

While this procedure provides a tire that is as functional as blackwall tires and in which the white sidewall treatment is retained and attractive over a typical life of the tire, the procedure is expensive and limits the kind of surface treatments. For example, the inventory requirements that would be created if tires of a variety of colored sidewalls were manufactured are enough in themselves to make such manufacture commercially unattractive.

In one embodiment, the present invention provides materials and procedures for forming facings on tire sidewalls at the place of sale of the tire. In this procedure for decorating tires, stock in only one kind of tire for each grade and size must be maintained. This tire may be sold as a blackwall tire, or it may be provided with a variety of sidewall facings including white facings, facings colored other than white such as the color of the automobile on which the tires are to be placed, and facings that provide a reflex-reflective sidewall. The novel sidewall facings are easily applied in a short time by the service personnel of a retail tire operation.

Though applied at the point of sale and notwithstanding the travel of the tire over uneven roadways, the heat of operation, the scuffing of the tire, and other aspects of outdoor exposure, the sidewall facings of tires of this invention are retained and attractive over a typical life of the tire. In addition, tires of the invention are safe and functional in the same way as conventional tires.

Besides providing sheet material useful as tire sidewall facings applied at the point of sale, this invention also provides tire sidewall facing materials for incorporation in tires during the tire building operation at the tire factory. These facing materials of the invention simplify those steps in tire manufacturing that relate to the formation of special effects on tire sidewalls and they also permit new kinds of tire sidewall treatments.

Tire sidewall facings are generally provided according to this invention as a thin sheet of dimensionally stable elastomeric material, typically between about 0.075 and 0.75 millimeter in thickness, carrying the desired surface treatment. This elastomeric material has long-lasting elastomeric properties of flexibility, stretchability, and quick, substantially complete, recovery. As a minimum, the material exhibits an elastic elongation of at least 200 percent and has a hardness similar to that of tire sidewall rubber. It generally has a tensile strength of at least about 140 kilograms/square centimeter and is resistant to such elements of tire exposure as heat, oil, ozone, and long contact with water.

These new tire sidewall facings are, in one form, adhered to the tire by adhesives applied to the tire and/or to the facing at the point of sale. They may also be manufactured with a layer of material that adheres the sheet material to the tire at the point of sale without the use of additional adhesives. In one embodiment, for example, the facing includes a back outside layer of vulcanizable elastomeric material that is compatible with tire sidewall elastomers and forms under heat and pressure a strong bond therewith. Tire sidewall facings having such a layer are, as indicated above, also incorporated in the tire at the tire building operation.

For use as colored sidewalls, the elastomer of the tire sidewall facings is preferably colorless and is pigmented to provide a substantially colorfast appearance. The sheet material should be free of agents that strain the facing during vulcanization or subsequent use of the tire. In one embodiment, a dense monolayer of large pigment particles is partially embedded in and strongly adhered to the surface of the sheet material that is to be exposed on the tire.

As noted above, another desirable surface treatment of this invention makes the tire sidewall reflex-reflective. When in place on a vehicle and illuminated by oncoming traffic at nighttime, these tires provide a bright, cone-shaped, substantially coaxial reflection of light back to the source of illumination, with sufficient spreading of the cone of returned light to make it visible to drivers of the oncoming vehicles. Since automobile headlamps and taillights are often recessed into the fenders of a car and designed to send their beams essentially straight ahead or directly backwards from the car, the lights of the car often cannot be adequately seen when approaching it from the side at night. The reflecting tires of this invention however are readily seen on the side of a car at night from distances of 100 meters or more and therefore provide a previously unavailable warning to oncoming traffic of the presence of a potential obstruction. One arrangement of the reflective treatment in widely separated dots along the edge of the tire provides attention-getting motion as the tires are rotating, thereby adding to the conspicuity of the vehicle.

In one preferred embodiment, such reflex-reflective tire sidewall facing materials of the invention include an elastomeric support sheet, on the front side of which reflex-reflective elements are partially embedded and permanently bonded, and a flexible cover sheet releasably adhered to the support sheet over the protruding elements. The cover sheet remains releasable even after subjection to heat and high pressure against the support sheet. At least the front portion of the sheet in which the reflective elements are embedded includes material having strong adhesion to the material of the elements. The reflex-reflective elements of this sheet material should be between about 0.025 and 1 millimeter in overall diameter and embedded in the support sheet to between about 30 and 80 percent of their height.

When used in the tire molding operation, according to one preferred practice, the rubber of the tire casing flows around the tire sidewall facing, with the support sheet being vulcanized to the casing as the casing is vuclanized and forming an integral part of the tire sidewall. After removal of the tire from the mold, the cover sheet is peeled back to reveal a reflex-reflective area having the shape established by the dimensions of the sidewall facing.

The invention is further illustrated in the drawings, wherein:

FIGURES 1, 2, and 3 are enlarged vertical cross-sections through portions of tire sidewall facings of the invention;

FIGURE 4 is a partial cross-section through a portion of a tire embodying a different reflex-reflective treatment according to this invention, and FIGURE 5 is a partial cross-section through a portion of a tire embodying a different reflex-reflective treatment according to this invention.

The tire sidewall facing 10 of FIGURE 1 includes a main sheet 11 which is comprised of two layers 12 and 13 of elastomeric material, the bottom layer 12 being especially adapted to adhesion to a tire casing, and the layer 13 being characterized by good specific adhesion to pigment particles. (As used here, specific adhesion refers to forces of attraction between the materials of two abutting structures and is distinguished from mechanical interlocking of the structures.) Pigment particles 14 (as, for example, spheroidal clusters of pigment powder particles bonded together by a nontacky transparent binder as described in Nellessen, U.S. Patent 3,251,704) are embedded and bonded in the layer 13. A removable liner 15, incorporated during manufacture of the facing and useful in the shipment, storage, and application of the facing, is adhered to the back of the bottom layer 12.

Example 1 illustrates the preparation of tire sidewall facings such as shown in FIGURE 1.

EXAMPLE 1

A conventional neoprene rubber blend for the layer 12 was first prepared using,

| | Grams |
|---|---|
| Polychloroprene (2-chloro 1,3-butadiene) (Neoprene W) | 100 |
| Magnesium oxide curing agent | 4 |
| Zinc oxide curing agent | 5 |
| Stearic acid curing agent | 0.5 |
| Antioxidant (1,3,5-trimethyl 2,4,6-tri (3,5-ditertiary butyl 4-hydroxy benzyl) benzene) (Ionox 330) | 2 |
| 2-mercaptoimidazoline accelerator | 0.1 |
| Titanium dioxide (rutile) pigment | 57 |
| Toluol solvent | 400 |

This blend was coated onto a silicone treated paper liner (15 in FIGURE 1) and the coating heated to about 65° C. for about 3 minutes to free it of the volatile solvent content and give a final thickness of about 0.075 millimeter.

The layer 13 was next coated over the exposed surface of the neoprene layer 12 using a material having good specific adhesion to the described pigment clusters, this material including a reactive mixture of a diglycidyl ether of bisphenol A and a polyether diamine.

The polyether diamine of this mixture was poly (tetramethyleneoxide) diamine prepared by the reaction of dicationically active polytetramethyleneoxide with ammonia. The specific polytetramethyleneoxide which was reacted with ammonia was first prepared by the polymerization of a commercial reagent grade, peroxide-free tetrahydrofuran monomer, the reaction being initiated by trifluoromethane sulfonic anhydride. This reaction was carried out in a 95-liter glass lined reactor equipped with a stirrer under about 0.7 kilogram/square centimeter of nitrogen pressure. Tetrahydrofuran in the amount of 79.9 kilograms was first stirred and cooled to 15° C. whereupon 1.63 kilograms of trifluoromethane sulfonic anhydride was added. The subsequent reaction took about 28.5 minutes with a maximum reaction temperature of 38° C.

The amination followed and was performed in a 190-liter stirred stainless steel reactor containing 1.95 kilograms of anhydrous ammonia dissolved in 43.35 kilograms of tetrahydrofuran. The polymerized polytetramethyleneoxide was drained from the 95-liter reactor under pressure through a 2.5 centimeter polyethylene tube into the closed amination kettle which was always under about 2.5 kilograms/square centimeter pressure and which was cooled continuously to about 12° C. After the draining of the polymethyleneoxide to the amination kettle was completed, in from about two to four minutes, the resulting solution was stirred for one-half hour and then the excess ammonia vented to the atmosphere. The excess tetrahydrofuran and residual ammonia were vacuum stripped off, while the temperature was gradually increased to about 40° C., after which the polyether diprimary diamine produced by the reaction was diluted to about 30 percent solids by the addition of toluene.

To remove the catalyst residue, any suitable strongly basic ion exchange resin may be added to the kettle. A satisfactory specific one is IRA402 sold by the Rohm and Haas Company. Infrared spectra examinations were performed on samples of the kettle contents to test whether the catalyst residue was removed, with the absence of absorption bands at 9.7 and 15.7 microns indicating when purification was complete. Additional ion exchange resin was used until the catalyst was completely removed. The mixture was then filtered and the filtrate vacuum-stripped at temperatures up to 95° C. to bring the product to 100 percent resin.

The resinous product was found to have a number average molecular weight of 10,000, an amine equivalent weight (measured by titration) of 4610, an inherent viscosity in benzene at 25° C. of 0.42, and a viscosity at 65° C. of 49,500 centipoises.

To prepare the polyether diamine-epoxy material of layer 13 this poly (tetramethyleneoxide) diamine in the amount of 100 parts by weight was first mixed and milled at room temperature on a three-roll paint mill with 50 parts of rutile titanium dioxide and 100 parts of toluol. To the resulting mixture the following materials were added and the whole mixture stirred.

| Material | Parts by weight |
|---|---|
| Diglycidyl ether of bisphenol A having an average epoxide equivalent weight of 190 (Epon 828) | 53.1 |
| N - beta - aminoethyl - gamma - aminopropyl trimethoxy silane adhesion promoter | 2.8 |
| Tris (2,4,6-dimethylaminomethyl) phenol catalyst | 2.65 |
| Dimethyl polysiloxane oil flow agent (having a viscosity of 350 centistokes/second) | 1.4 |

The elastomeric material thus prepared had good adhesion to surfaces or materials to which adhesion is typically difficult, as indicated by the following test showing good adhesion to glass and simulating the conditions of the material's embodiment in a tire. The elastomeric material prepared above was first coated on plate glass and dried. Tire sidewall rubber stock was then laid over the coating, and the overlaid components pressed and heated to cure them. This sample was then peeled back from the glass in an Instron tester. When pulled by a force applied normal to the surface and at a rate of 2.5 centimeters/minute, the sample exhibited an adhesive force of resistance of 4.3 kilograms/centimeter of sample width. The material was found to cure after several days at room temperature or when heated to 90° C. for about 2 hours or to 150° C. for about 20 minutes; however, much stronger adhesion to glass results from the high-temperature cure.

This material was coated on to the neoprene layer 12 using a bar coater. The coated layer and paper were passed through an oven heated to about 70° C. for about 5 minutes to remove only a portion of the solvent, whereupon the layer 13 had a thickness of about .05 millimeter.

Pigment clusters 14 as described in U.S. Patent 3,251,704 cited above were next embedded into this semi-dry coating. The clusters used were between about 2 and 70 microns in diameter and formed from titanium dioxide pigment powder particles of about 0.3 micron average diameter bonded into clusters by a silicate binder. The clusters had been treated with a fluorocarbon sizing (such as water-soluble, chlorine-containing chromium coordination complexes of perfluoroalkanesulfonamido alkylenemonocarboxylic acids) making them oleophobic so that the embedding material would not creep over the top of the elements. The pigment clusters were deposited onto the coated, semi-dry layer 13 described above behind a brush which spread the clusters uniformly and evenly onto the layer 13, and the excess of the clusters then shaken off. The web was then passed through an oven heated to 150° C. for 15 minutes. At this time the clusters were found to be embedded in the coating to about 50 percent of their depth.

The resulting sheet product was then cut into narrow widths and rolled up for storage. At this stage the epoxy-polyether diamine material of layer 13 had not been heated for a sufficient period of time to be fully cured. When it did subsequently completely cure during storage after completion of the product or, if so used, in the tire mold, it formed a rubber splitting bond with the neoprene rubber.

The exterior dense monolayer of large pigment particles carried in the described facing is firmly bonded into the main sheet 11 and provides a rather constant colored surface even in spite of possible color changes in the main sheet itself. However, the main sheet itself is desirably pigmented and should be nonstaining. The appearance of a facing such as that described in Example 1 is typically a rather nonglossy, rich color.

An alternative type of colored tire sidewall facing material of this invention is illustrated in FIGURE 2 and in Example 2. This facing material includes a three-layer main sheet 18 carried on a liner 19. The bottom layer 20 is similar to the layer 12 of the previous example, while the layer 21 is a pigmented elastomer and the layer 22 is a protective elastomeric layer.

EXAMPLE 2

The neoprene layer 20 was coated in a 0.125-millimeter dry thickness using the material and procedure of Example 1.

The layer 21 included the following ingredients:

| | Parts by weight |
|---|---|
| A sterospecific styrene-butadiene copolymer (Kraton 101) | 100 |
| Antioxidant (Ionox 330) | 2.6 |
| Fire-orange daytime fluorescent pigment (particles having an average diameter of 4.5 microns and comprising thermoplastic melamine sulfonamide formaldehyde resin containing a fire-orange dye; D-14-1017 pigment of Switzer Brothers) | 50 |
| Toluol | 200 |

This elastomeric material was stirred into solution and coated out on the exposed surface of the layer 20 in an amount sufficient to give a dry film having a thickness of 0.125 millimeter. The facing material was dried at this point for 15 minutes at 65° C. and 10 minutes at 90° C.

The layer 22 included the following ingredients:

| | Parts by weight |
|---|---|
| An isocyanate-terminated prepolymer of poly (oxytetramethylene) glycol and tolylene | 100 |
| 4,4'-methylene bis-(2-chloroaniline) | 13 |
| 2,2'-dihydroxy 4,4'-dimethoxybenzophenone and other substituted benzophenones | 5.7 |
| Ethyl acetate | 29 |
| Phenyl mercuric acetate | 0.1 |

The benzophenones were dissolved in the ethyl acetate and this solution then added to the prepolymer after which all the ingredients were mixed together and coated on the layer 21 in an amount sufficient to gve a dry film of 0.025 to 0.05 millimeter thickness. The product was then dried for 40 minutes at 90° C.

FIGURE 3 and Example 3 illustrate a tire sidewall facing material of this invention with which reflex-reflective treatments can be provided on automobile tires. The facing material shown in FIGURE 3 comprises a main sheet 24 including a bottom vulcanizable elastomeric layer 25 similar to the previously described layers 12 and 20 and an elastomeric layer 26 of material having good adhesion to reflex-reflective elements and similar to the layer 13 previously described. The main sheet 24 carries a liner 28 and a cover strip 29. Reflex-reflective elements 30 are partially embedded in the layer 26.

EXAMPLE 3

A poly (tetramethyleneoxide) diamine-epoxy elastomeric material like that of Example 1 except for the use of 9.8 parts of carbon black instead of the titanium dioxide was coated on a silicone-treated release paper using a bar coater to provide the layer 26. The material was applied in a wet thickness of 0.45 millimeter and the coated paper was passed through an oven heated to 65° C. for about 3 minutes to remove only a portion of the solvent.

Reflex-reflective elements 30 were next embedded into this semi-dry coating. The reflective element used was an aggregate of transparent, glass sphere-lenses adhered to rigid glass cores with a minute light reflecting layer underlying the lenses and in optical connection with their back surface. The sphere-lenses, which had an index of refraction of about 1.91, were between about 35 and 75 microns in diameter, and the whole aggregate had an average diameter of about 0.45 millimeter. The aggregate had been treated with a fluorocarbon sizing in the same manner as the pigment clusters of Example 1 making the aggregate oleophobic so th at the embedding material will not creep over the top of the elements. The aggregate was cascaded onto the coated, semi-dry solution described above, the excess of the aggregate shaken off, and the web passed through a pair of rubber nip rollers which exerted a gentle force on the web. The web was then passed through an oven heated to 80° C. for 15 minutes. At this time the aggregate was found to be embedded in the coating to about 60 percent of the depth of the aggregate particles.

The aggregate-covered layer 26 was next coated over the aggregate side with silicone rubber to provide the releasable cover sheet 29. The coating bar was set about 0.13 millimeter above the protruding height of the aggregate. After being coated, the laminate web was passed through an oven heated to 90° C. for about 10 minutes to cure the silicone rubber.

A conventional neoprene rubber blend for use as the layer 25 was next prepared using,

| | Grams |
|---|---|
| Polychloroprene (2 - chloro 1,3 - butadiene) (Neoprene W) | 100 |
| Toluol | 450 |
| Antioxidant (Ionox 330) | 2 |
| Magnesium oxide | 4 |
| Zinc oxide | 5 |
| Stearic acid | 0.5 |
| Carbon black | 17.9 |
| Tetramethyl thiuram monosulfide | 1 |
| Diorthotolylguanidine | 0.5 |
| Sulfur | 1 |

This blend was coated in a 0.3 millimeter thickness onto a silicon-treated paper liner (28 in FIGURE 3) and the coating heated to 65° C. for about 3 minutes to free it of the volatile solvent content. The paper carrier was stripped from the composite structure described above and discarded and the bared surface laminated to the exposed surface of the neoprene rubber coating. At this stage the epoxy-polyether diamine material of layer 26 had not been heated for a sufficient period of time to be fully cured. When it did subsequently completely cure during storage after completion of the product or in the tire mold, it formed a rubber splitting bond with the neoprene rubber. After the lamination step, the structure was passed through nip rollers. Lastly, this reflex-reflective tire sidewall facing material was cut into smaller assemblies of the desired pattern.

The reflex-reflective aggregate described above has some advantages in reflex-reflective products of this invention since it reflects light in the direction of the source even though illuminated at a high angle of incidence (measured from the normal to the support sheet surface). For example, reflex-reflecting surfaces of this invention, using aggregate, reflect light at an angle of incidence as high as about 90° from normal to the surface of the transfer assembly. Aggregate is also advantageous because of the mechanical adhesion developed between it and the support sheet in addition to specific adhesion.

Notwithstanding these advantages, transparent glass beads are preferred for use in reflex-reflective treatments of the invention. Glass beads have been found to provide a more attractive tire sidewall and, in addition, they offer more flexibility in the color of the treatment and their use simplifies manufacture of the facings. Typically, the diameter of aggregate is between about 0.2 and 1 millimeter, and the diameter of beads between about 0.025 and 1 millimeter, though larger sized elements may be used. When beads are used, the bead-covered support sheet may be given a corrugated configuration, as by pressure against an appropriately shaped die in the tire mold to thereby increase the angle at which light is reflected, as compared to a flat surface carrying partially embedded glass beads.

The following examples illustrate reflex-reflective sidewall facing using glass beads.

EXAMPLE 4

The glass beads incorporated in the facing material of this example were transparent and substantially colorless, had an index of refraction of 1.91, and had a diameter range of 35 to 75 microns. These beads were deposited in a dense monolayer on a paper liner coated with about 0.05 millimeter of polyethylene by passing the liner, polyethylene side out, around a heated roller, the edge of which was buried in a pan containing the beads. The liner and beads were then passed for about a minute through an oven heated to about 130° C. where the beads became embedded in the polyethylene to about ⅓ their height. A thin layer of aluminum was then vapor-deposited on the bead coated side of the web.

The poly (tetramethyleneoxide) diamine-epoxy material described in Example 3 was then coated over the aluminum layer on the web. After being partially cured for 40 minutes at about 90° C. the layer had a thickness of about 0.15 millimeter. Over this layer the neoprene blend described in Example 3 was coated and the solvent driven off. A 0.125 millimeter polyethylene film was next laminated to the neoprene layer, after which the original polyethylene coated paper liner was removed from the beaded side. The resulting facing material was similar in cross-section to the material illustrated in FIGURE 1.

EXAMPLE 5

The neoprene rubber blend described in Example 3 was cast onto a double-coated silicone paper in a 0.3 millimeter wet thickness and dried 5 minutes at 82° C. The poly (tetramethyleneoxide) diamine-based solution coated as layer 13 in Example 3 was next coated over the neoprene rubber with the notched smoothing bar set at 0.25 millimeter, and the web then further dried for 5 minutes at 90° C. to partially drive out solvent.

The reflective elements used were yellow glass beads having an index of refraction of 1.91 and a diameter range of 35 to 75 microns. They had been coated over their entire surface with a bright metallic layer of vapor-deposited aluminum and then sized with fluorocarbon to make them oleophobic. These beads were cascaded onto the laminate web forming a monolayer and floating a little deeper than their equator in the poly (tetramethyleneoxide) diamine-based layer. The sheet was then passed into the oven and cured for 20 minutes at 120° C. From the oven the sheet was carried into a 4 percent aqueous solution of sodium hydroxide for about 2 minutes to etch off the exposed aluminum and then washed in water and dried.

Lastly, a reinforcing scrim of nonwoven rayon fibers was laid over the beaded surface of the laminate sheet structure, and then silicone rubber was coated over the scrim and sheet structure with the smoothing bar set at 0.13 millimeter above the beads. The web was then cured 10 minutes at 90° C. after which facings, to be embodied in tires in the manner previously described, were cut in the desired shape.

The tire sidewall facing materials illustrated in the above examples may be adhered to tires either at the point of sale, as with adhesive, or during manufacture of the tire itself, as by vulcanization along with the other time components. When the facing materials are to be adhered at the point of sale, the tires are preferably formed with an appropriately shaped recess, either by molding or buffing during manufacture of the tire or by buffing at the point of sale. As illustrated in FIGURES 4 and 5, tires adapted for sidewall facings of this invention are preferably molded with scuff rings 17 whereby the recesses are made effectively quite deep without lessening the thickness of the main portion of the tire sidewall. The most desirable depth of the recess varies with the thickness of the tire sidewall, the width of the strip to be applied, and the location of the facing on the sidewall. The depth of the recess (including the height of any scuff ring) should be sufficient that in ordinary tire usage the facing in the recess will seldom be scuffed. In general, it may be said that a ratio of width to depth for the recess at least less than about 10 to 1 is desirable and a ratio of about 4 to 1 is more preferable. Narrow sidewall facings are best; preferably they are less than 2 centimeters in width.

To provide a long-lasting facing on a tire by adhesion after vulcanization of the tire, an elastomeric adhesive forming a bond of high strength between the tire sidewall facing materials of the invention and the vulcanized rubber of a tire is required. One standard for measuring whether a particular adhesive had the necessary bond strength is a peel test in which the adhesive is used to bond a strip of the rubber to be bonded to a block of similar rubber and the strip then pulled from the block at an angle of 90° at a rate of 5 centimeters/minute.

To obtain a tire in which the sidewall facing material is satisfactorily retained on the tire, the adhesive bond should be such that a force of at least one kilogram/centimeter is required in the above test. For a tire of the most desired durability and long life, the resistance to peel of the sidewall facing should be at least 3 kilograms/centimeter of width and preferably even higher. Such forces of adhesion are believed to require specific adhesion between the tire casing and facing. Preferably adhesives used to apply facings of this invention form a bond at low temperature, such as room temperature, so that heating of the tire is avoided.

Neoprene-phenolic cements have been used to satisfactorily bond sheet materials of this invention to tire rubber, especially to tires of neoprene rubber. For example, in a test as described above, 2.5-centimeter by 12.5-centimeter strips of neoprene tire rubber in about a 0.9-millimeter thickness were adhered to 5-centimeter by 10-centimeter by 0.63-centimeter blocks of vulcanized neoprene tire rubber using an adhesive of the following formulation:

|  | Parts by weight |
|---|---|
| Poly (2-chloro 1,3-butadiene) (Neoprene AC) | 100 |
| Phenol-formaldehyde resin (reaction product of formaldehyde with less than an equal mol proportion of paratertiary-butyl phenol) | 70 |
| Light calcined magnesia | 20 |
| Zinc oxide | 5 |
| Sodium acetate | 1 |
| Petrobenzol | 210 |
| Methyl ethyl ketone | 150 |
| Toluol | 27 |

The block of neoprene rubber was abraded with a grinding wheel and the adhesive coated on both the facing material and the block, with the adhesive allowed to dry for about 10 to 20 minutes. The sheet material was pressed against the block and rolled with a rubber roller at about 0.7 kilogram/square centimeter pressure. After two days, at which it is estimated the bond had reached 90 percent of its full strength, about 4.45 kilograms/centimeter of width were required to peel the sheet material from the neoprene rubber block.

To have the desired dimensional stability, the neoprene rubber layers 12 and 20 of Examples 1 and 2, respectively, are preferably in a vulcanized condition when the facing materials of those examples are adhered to an already vulcanized tire. Neoprene is a preferable material for the layers 12 and 20 when using a neoprene-phenolic cement since better adhesion is then obtained between the facing and tire. When the layer 12 or 20 comprises a vulcanizable, as opposed to a vulcanized, neoprene elastomer, for example, the facing may be adhered to a neoprene veneer of a tire without the use of an adhesive by pressing the facing against the tire and heating the facing, whereupon the neoprene layer of the facing forms a cured bond with the tire.

A preferred reflux-reflective tire product incorporates a support sheet carrying reflex-reflective elements, as described in Example 3, in the tire as an integral part of the sidewall. Such a structure has been obtained through including in at least a back outside stratum of the support sheet a strong, tough elastomer that is vulcanizable or curable at the time the casing and sheet are placed in the tire mold. The whole support sheet may be a vulcanizable material or a mixture of a vulcanizable material and some other material, or only the back layer may be a vulcanizable material. Many elastomers are suitable besides those illustrated, chlorosulfonated polyethylene (Hypalon 20), for example, being useful.

The facing material of Example 3 was incorporated into tires during a tire making process by the following procedure. After the silicone-treated paper liner 28 was removed, a narrow width of the material was placed, together with a tire carcass of overlaid rubbery layer components, in a tire mold. The facing material of this invention was located, with respect to the carcass, so that after the carcass was expanded and shaped in the mold, the facing material would be located according to the desired design on the exterior tire sidewall surface. After expansion of the tire carcass, the bared neoprene rubber surface of the material was against the exterior of the remaining thickness of the tire sidewall and the silicone rubber cover sheet was against the inside tire mold surface. During the tire molding process, which was a standard one, the tire carcass was heated in the tire mold to about 153° C. under an inflation pressure of about 21 kilograms/square centimeter for about 15 minutes. The finished tire was then removed from the mold. The facing was found to form a unified part of the vulcanized tire casing, with the tire formed around the assembly but not under the cover sheet. The cover sheet was readily removed to reveal a surface covered by reflex-reflective elements embedded in the tire to about the same depth as when originally embedded in the layer 13.

Facing materials prepared as in Example 4 were also incorporated in a tire in a similar tire molding operation. In this operation, however, there was no cover strip on the facing material but because of the shallow exposed depth of the beads, none was needed. In this operation, a strip of the facing material was wrapped around the barrel-shaped layers of green rubber, and the ends of the strip overlapped and pressed together. When the tire was formed, this strip became positioned on the tire sidewall. In the mold, an annular ring was pressed against this strip so that in the final tire an annular depression was formed in the strip. The portions of the strip not in the depression, but extending into the adjacent portions of the tire sidewall surface were buffed away to form a very precisely-dimensioned reflective sidewall area.

FIGURE 4 illustrates a tire made by the first-described procedure mounted on a rim 33. This tire includes a scuff ring 17 with a facing 23 vulcanized into the tire sidewall 34. While FIGURE 4 specifically illustrates a reflex-reflective tire, it should be understood that other facing materials of the invention could be vulcanized into the tire in the same way. It should also be understood that a tire similar in cross-section could be prepared according to this invention by forming a recess in the tire and then adhering a facing such as the facing 23 or other facings of the invention in the recess. For purposes of this specification "recess" includes a recess formed in a tire for application of a facing after vulcanization, as well as the area of a tire occupied by a facing of this invention vulcanized in the tire.

A layer of adhesive material may also be used, either instead of or in addition to a layer of vulcanizable material to prepare useful reflex-reflective tires, by adhesion of the facing after vulcanization of the tire. A tire made in this way is illustrated in FIGURE 5. These tires are prepared by adhering a reflex-reflective facing 37 to a tire casing 35, or to detachable portions of, or inserts for, a tire casing, by an adhesive layer 36 either during or subsequent to the tire molding operation.

For a satisfactory, long, attractive life on a tire, the tire sidewall facing materials of the invention should have certain properties. They should exhibit, first of all, long-lasting elastomeric properties; that is, they should be flexible, stretchable, and elastic over the typical life of the tire, and have good strength properties. The facing materials should exhibit an elastic elongation of at least 200 percent, and preferably even more. Their elastomeric properties should, generally, be similar to those of the sidewall elastomers; that is, the main sheets should not be so rigid nor flexible and stretchable as to alter significantly the normal flexing of the tire. In general, this can be indicated, as noted above, by comparing the hardness of the facing material with that of the tire sidewall rubber. Using the Shore A hardness test, it has been found that the hardness of tire sidewall facing material useful on conventional tires should be between about 40 and 90 and more preferably between about 50 and 70. Further, as noted above, the facing materials should generally have a tensile strength of at least about 140 kilograms/ square centimeter and be resistant to ozone and other elements of outdoor exposure, and should not be degraded by heat, oil, or by long contact with water. For best results the facing materials of the invention should also be thin. If too thick it is difficult to have a satisfactorily appearing overlapped joint of the facing on a tire. Further, a thin facing conforms better on the tire during application and during use as the tire flexes. For these reasons, it has been found that the facing should be between about 0.075 millimeter and 0.75 millimeter in thickness, and preferably between about 0.1 and 0.25 millimeter. However, thicker facing materials of the invention can be prepared and satisfactorily used.

A cover sheet, such as the cover sheet 29, is a preferred element of facing materials that use aggregate as the reflex-reflective elements and are to be incorporated in a tire during the tire molding process, since the cover prevents the rubber of the tire from covering the surface-treatment of the facing during the molding operation and preserves the amount by which, for example, the reflex-reflective elements protrude. The cover sheet need not be removed until after sale of the completed tire to consumers so that the surface is protected. Other materials than the particular silicone rubber described also serve the desired function. Where the facing material is to be adhered to previously made tires, the cover sheet may be omitted, although some form of cover sheet is preferably used even in such cases to preserve the surface appearance of the facing while being marketed and while being adhesively affixed to a tire.

In reflex-reflective tire sidewall facing materials of the invention, strong, tough, curable elastomeric materials having good specific adhesion to the contacted surface of the reflex-reflective elements are much preferably used between the elements and the rest of the elastomers of the facing material that are vulcanized as the tire sidewall. However, reflective treatments using reflex-reflective elements embedded in rubber, such as neoprene, natural, and styrene-butadiene rubber, exhibit useful but less durable properties. Preferably the embedding material should have a specific adhesion to the material of the contacted surface of the elements, as measured by the test given in Example 1 above for adhesion to glass, of at least about one kilogram/centimeter of width and preferably about three kilograms/centimeter of width. In general, elastomeric epoxy-containing materials provide the desired adhesive properties. The reflex-reflective elements should be embedded in the support sheet to between about 30 and 80 percent, preferably 50 to 70 percent, of their height.

As indicated above, the main sheet 24 of the reflex-reflective facing illustrated in FIGURE 3 may be a single-layer structure of a material that both exhibits good specific adhesion to glass and remains volucanizable or curable until the facing material is placed with a tire casing in a tire mold. Colored tire sidewall facings of the invention may be single-layer provided they have a substantially colorfast appearance on one surface and are adapted to adhesion to a tire casing on the other surface. The following example illustrates the preparation of a reflex-reflective single-layer facing material:

EXAMPLE 6

Silicone rubber to serve as a releasable cover sheet, such as the cover sheet 29 in FIGURE 3, was cast onto 38.5 kilogram, unbleached kraft paper in a 0.13 millimeter thickness. Aggregate of the kind used in Example 3 was cascaded onto the silicone rubber, and the rubber then cured by heating the web for 20 minutes at 90° C. The product was completed by coating a mixture including vulcanizable elastomer and glass-adhesive elastomer over the aggregate covered surface of the silicone rubber, this latter layer serving as a single-layer support sheet. The material coated was prepared by first mixing the following ingredients:

| | Grams |
|---|---|
| A stereospecific styrene-butadiene copolymer (Kraton 101) | 875 |
| Carbon black | 150 |
| Tuluol | 3000 |
| Antioxidant (Ionox 330) | 12.5 |

The complete material was formed by mixing the foregoing components into a uniform blend by stirring and then passing the mass three times through a three-roll paint mill. Then the following ingredients were added with stirring to gain a composite blend.

| | Grams |
|---|---|
| Poly (tetramethyleneoxide) diamine prepared as described above | 500 |
| Pentaerythritol ester of rosin (Pentalyn A) | 50 |
| Epon 828 | 132 |
| DMP–30 | 6.25 |
| Toluol | 500 |

The resulting blend, which has a pot life of eight hours, was coated over the aggregate surface of the web using a smoothing bar set 0.5 millimeter above the aggregate. The web was heated 15 minutes at 90° C. to drive off solvent and partially cure the coating.

The above examples describe preferred practices of this invention. However, a variety of other materials have the properties requisite in a useful tire sidewall facing, and variations in structure that retain the essential structural relationships for providing colored sidewalls, partially embedded reflex-reflecting elements, or other surface treatments on a tire are possible with such materials. Also, it may be expected that materials discovered or prepared in the future will be incorporated in tires in the manner taught by this invention. This invention contemplates the use of all such materials and structural variations as indicated in the above discussion.

While the materials of this invention have been described as particularly useful as tire sidewall facings, other uses are made of them. For example, facing materials of this invention have use on tires for other vehicles or for other uses on tires, such as trademark insignias. In addition, reflex-reflective sheet materials of this invention have been used as a partial covering for traffic cones to make them reflex-reflective.

What is claimed is:

1. A sheet material comprising an elastomeric support sheet and a dense monolayer of small discrete elements partially embedded in the support sheet, the support sheet comprising an organic compound having oxirane functionality and a poly (tetramethyleneoxide) diamine reactive with the oxirane groups of said organic compound.

2. A sheet material of claim 1 in which the elements are reflex-reflective elements.

3. A sheet material of claim 1 in which the elements are glass beads.

4. A sheet material of claim 1 in which the elements are pigment particles.

5. A tire sidewall facing material for forming in tires durable flexible stretchable and elastic reflex-reflective sidewall portions that provide a bright cone-shaped substantially coaxial reflection of incident light as a night time signal of the location or movement of vehicles equipped with the tires comprising an elastomeric support sheet having long-lasting elastomeric properties similar to those of the sidewall elastomers of tires including an elastic elongation of at least 200 percent, and reflex-reflective elements partially embedded in the support sheet, at least the back outer stratum of the sheet including a vulcanizable elastomer compatible with said sidewall elastomers and forming under heat and pressure a strong bond therewith.

6. The tire sidewall facing material of claim 5 and a thin cover sheet that is releasably adhered to the support sheet over the protruding reflex-reflective elements and that remains releasable even after subjection to heat and high pressure against the support sheet.

7. The tire sidewall facing material of claim 5 in which the reflex-reflective elements are discrete particles of an aggregate of transparent glass sphere-lenses around a rigid core, with a minute light reflecting layer underlying each lens in optical connection with its back surface.

8. The tire sidewall facing material of claim 5 in which the reflex-reflective elements are between about 0.025 and 1 millimeter in diameter, partially embedded in the support sheet to between about 30 and 80 percent of their height, and permanently bonded there by material having strong specific adhesion to the elements.

9. A facing material of claim 8 in which the reflex-reflective elements are transparent glass beads covered over their embedded surface with a thin layer of reflective material.

10. The tire sidewall facing material of claim 5 in which the support sheet includes a first layer of vulcanizable elastomer that is compatible with said sidewall elastomers and forms under heat and pressure a strong bond therewith, and strongly adhered to the first layer a second layer of an at least partially cured elastomeric material that includes a compound having oxirane functionality and a curing agent reactive with the oxirane groups of said compound, and in which the reflex-reflective elements are partially embedded and permanently bonded in the second layer.

11. The tire sidewall facing material of claim 10 in which the compound having oxirane functionality is a diglycidyl ether of bisphenol A and the curing agent reactive with said compound is a poly(tetramethyleneoxide) diamine.

12. A tire sidewall facing material for forming durable reflex-reflective tire sidewall portions that provide a bright cone-shaped substantially coaxial reflection of incident light as a night-time signal of the location or movement of vehicles equipped with the tires comprising (1) an elastomeric support sheet between 0.075 and 0.75 millimeter in thickness that includes (a) a first layer of vulcanizable elastomer that is compatible with the sidewall elastomers of tires and (b) strongly adhered to the first layer, a second layer of an at least partially cured color-pigmented elastomeric material, and (2) transparent glass beads between 0.025 and 1 millimeter in diameter partially embedded in the support sheet to between 30 and 80 percent of their height and covered over their embedded portion with a thin layer of reflective material, the material of the second layer having a specific adhesion to the embedded beads of at least 3 kilograms/centimeter of width, and the elastomeric support sheet when fully vulcanized and cured being capable of an elastic elongation of 200 percent or more and exhibiting a Shore A hardness of between 40 and 90.

References Cited

UNITED STATES PATENTS

| | | | |
|---|---|---|---|
| 2,555,715 | 6/1951 | Tatum | 117—29 X |
| 2,560,040 | 7/1951 | Whipple | 117—138.8 |
| 2,567,233 | 9/1951 | Palmquist et al. | 117—29 X |
| 2,711,985 | 6/1955 | Olson | 117—138.8 X |
| 2,992,957 | 7/1961 | Maxey | 117—138.8 X |
| 3,030,223 | 4/1962 | Alastad et al. | 117—76 X |
| 3,030,251 | 4/1962 | Bore et al. | 117—29 X |
| 3,249,947 | 5/1966 | Williams | 343—912 |
| 3,355,311 | 11/1967 | Gosselink | 117—29 X |
| 2,383,884 | 8/1945 | Palmquist | 350—105 |
| 2,592,882 | 4/1952 | Fisher et al. | 350—105 |
| 2,607,130 | 8/1952 | Pearson | 350—105 X |
| 3,128,815 | 4/1964 | Nonnamaker | 152—353 |
| 3,164,192 | 1/1965 | Kasio et al. | 152—353 |
| 3,176,584 | 4/1965 | De Vries et al. | 161—406 X |
| 3,227,604 | 1/1966 | Morgan | 161—406 X |
| 3,253,146 | 5/1966 | De Vries | 350—105 X |
| 3,253,634 | 5/1966 | De Young | 152—353 |
| 3,288,618 | 11/1966 | De Vries | 161—168 X |

HAROLD ANSHER, *Primary Examiner.*

U.S. Cl. X.R.

161—168, 185, 401